INVENTOR
GEORGE H. KOISTINEN
LOWELL J. SCHREIBER
BY Robert M. Dunning
ATTORNEY

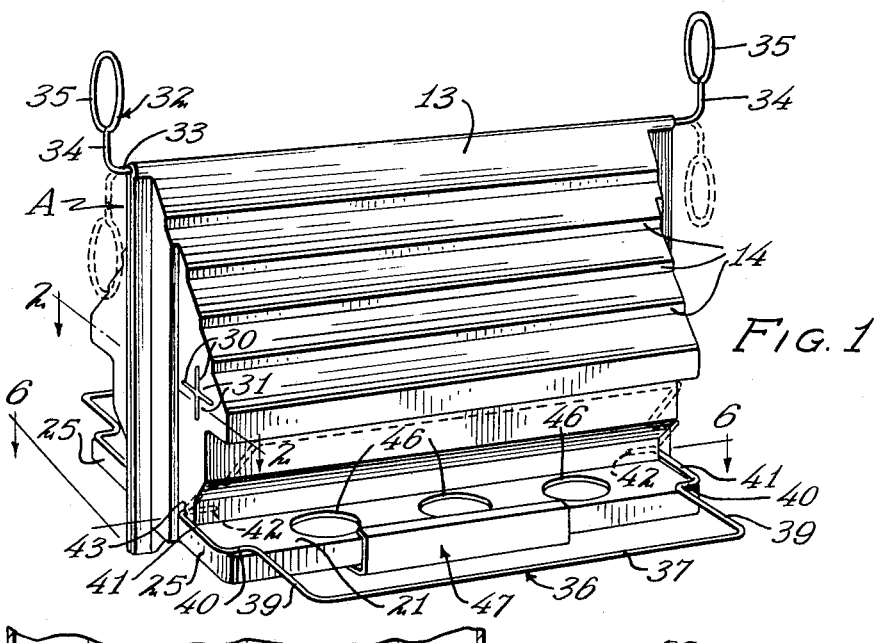
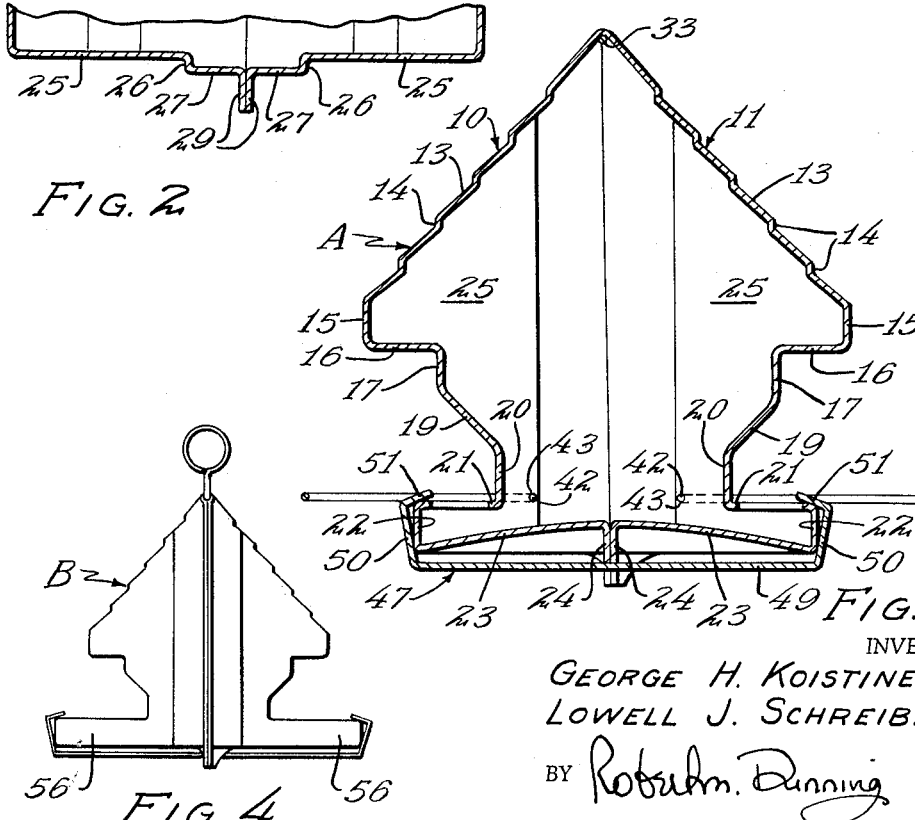

United States Patent Office 3,157,159
Patented Nov. 17, 1964

3,157,159
BIRD FEEDERS
George Howard Koistinen, Sioux Falls, S. Dak., and Lowell J. Schreiber, Breckenridge, Minn., assignors to Washburn Enterprises, Inc., Hartford, S. Dak., a corporation of South Dakota
Filed May 23, 1962, Ser. No. 197,058
10 Claims. (Cl. 119—52)

This invention relates to an improvement in bird feeders and deals particularly with a simple and inexpensive enclosure for containing bird feed and which simulates a bird house in appearance.

Many persons follow the practice of spreading feed out-of-doors for birds. Not only does this tend to attract birds to an area, but it also saves the lives of many birds, particularly when the ground is covered with snow. Bird feeders vary very considerably in design and appearance. For the most part, they comprise merely receptacles of one type or another into which feed may be poured and maintained out of contact with the ground. It is an object of the present invention to provide an inexpensive bird feeder which may be initially filled with feed and which may act as the feed container until it is delivered to the ultimate purchaser.

During the last few years, the use of vacuum molds to shape plastic sheets has greatly increased. Molds used for this purpose are relatively inexpensive, and can be quickly produced. The plastic sheets which are used in the molding process are relatively inexpensive, and may be printed or otherwise decorated prior to the molding operation. The objects thus molded are water proof and are sufficiently flexible and resilient as to withstand rough usage. Furthermore, receptacle formed of plastic sheeting are light in weight and very resistant to the elements. As a result, a feeder formed of sheet plastic in molded form forms an attractive and desirable addition to the scenery.

An object of the present invention resides in the provision of a feeder which is formed of a single sheet of plastic which is drawn into proper form to simulate two sides of a bird house or a similar item flexibly connected together. The two sections are shaped to provide a marginal flange extending about all but the connected edges of the two sections. By centrally flexing the molding sheet and bringing the two sides of the structure into side by side relation, a feeder is formed which simulates a bird house or similar object. Before the two halves of the structure are permanently sealed together, the structure is filled with feed so that when the dispensing openings have been formed, the contents of the feeder may be consumed.

A feature of the present invention resides in the feeder of the type described comprising a hollow body to accommodate the seed, and hollow laterally extending legs at the lower end of the body. Potential openings are formed in the upper surface of these laterally extending legs, usually by die cutting or perforating the sheet to define weakened lines of separation encircling a removable area. By severing the plastic sheeting about removable areas, these parts may be discarded, leaving openings in the upper surfaces of the laterally extending legs which provide access to the feed on the interior of the feeder.

A further feature of the present invention resides in the provision of a novel and effective means for supporting the feeder. A generally U-shaped supporting loop is enclosed within the folded area connecting the two sections before the two sections are sealed together. This U-shaped supporting wire includes a transversely extending central portion which is pivotally supported in the fold, and loop-shaped ends through which a supporting cord of wire may extend. The supporting member is pivotally engaged between the two sections, so that the ends thereof may be folded down against the ends of the feeder during shipment and storage.

A further feature of the present invention resides in the provision of simple wire roosts or perches which include inturned opposed ends pivotally supported in opposite ends of the feeder. These perches extend outwardly from the sides of the feeder and provide a roost or perch on which the birds stand while feeding. At the same time the perches may pivot upwardly against the sides of the feeder during shipment and storage to save space.

A further feature of the present invention resides in the provision of a clip of metal or similar material which is secured across the bottom of the feeder to prevent any danger from separation between the two sections of the feeder. This clip engages the marginal flange projecting downwardly from the meeting surfaces of the two sections and flexes the bottom of the feeder upwardly at its center so as to guide the seeds into the laterally extending legs.

Still another feature of the present invention resides in the provision of a bird feeder which is pivotally supported for movement about a transverse horizontal axis and which includes perches extending laterally on opposite sides of said pivot axis. As a result, when a bird alights on a perch on one side of the feeder, the weight of the bird tends to swing the corresponding side of the feeder inwardly and downwardly. This is particularly true when the feeder is almost empty. As the side of the feeder supporting the bird swings inwardly and downwardly, the seeds tend to slide or roll toward the corresponding leg of the feeder where the feed is readily accessible to the bird.

A further feature of the present invention resides in the provision of a feeder which may, if desired, be transformed into a bird house after it has been emptied of seed. If desired, potential openings may be formed in the side walls of the feeder, these openings remaining closed until the feeder has been emptied. By opening the openings, the feeder may be used as a bird house, and the openings in the laterally extending legs of the feeder may serve as ventilation openings.

These and other objects and novel features of the present inventon will be more clearly and fully set forth in the following specification and claims:

In the drawings forming a part of the specification;

FIGURE 1 is a perspective view of the feeder in readiness for operation.

FIGURE 2 is a horizontal sectional view through one end of the feeder, the position of the section being indicated by the line 2—2 of FIGURE 1.

FIGURE 3 is a vertical sectional view through the center of the feeder.

FIGURE 4 is an end elevational view of the slightly modified form of feeder.

Figure 5:
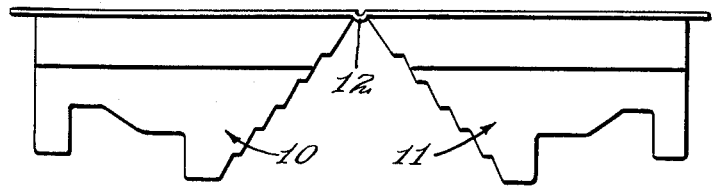
FIGURE 5 is an end elevational view of the feeder after the initial molding operation.

The feeder is generally illustrated in the drawing by the numeral A and includes a pair of sides 10 and 11 which may be identical in form, or which may vary somewhat in appearance if it is preferred. As indicated in FIGURE 5 of the drawings, the sections 10 and 11 are drawn from a flat sheet of material, the two sections being connected along a central line of hinged joint 12. The material forming the feeder is sufficiently flexible and resilient to fold from the position illustrated in FIGURE 5 of the drawings to face contact as indicated in FIGURE 3 of the drawings, the hinge joint 12 flexing through one hundred eighty degrees, or each section flexing through an angle of ninety degrees.

Each of the sections 10 and 11 includes a sloping roof portion 13 which is formed in ribs such as 14 or to simulate the shingles. The roof portions 13 terminate in short vertically extending portions 15 which provide opposed eaves, and which are connected at their lower end to inwardly extending portions 16 which have the appearance of the under side of the projecting eaves. Vertical wall portions 17 extend downwardly from the inner edges of the eave portions 16 and are connected to downwardly and inwardly inclined wall portions 19. The lower edges of the inclined portions 19 are connected to vertical portions 20 which in turn are connected to horizontally extending ledges 21. The ledges 21 are connected by vertical edge portions 22 to normally flat bottom portions 23 which support the downturned marginal connecting flanges 24.

As is indicated in the drawings, the integral end portions of the sections 10 and 11 include flat sides 25 connected by short offsets 26 to vertically extending portions 27 which are parallel to the sides 25 and spaced outwardly therefrom. At the parting line between the two sections, outturned flanges 29 are provided which engage in face contact when the two sections are hinged together. The outwardly offsetting of the adjoining portions of the end panels serves to reinforce the end panels, and also provide the general appearance of a chimney extending up each end of the end wall. The end panel 25 at one end of the body is provided with a pair of right angularly extending slits 30 which are of insufficient width to permit the seed to escape. The two crossed slits 30 form four generally triangular flaps 31 which may be flexed inwardly to accommodate a filling nozzle. In other words, if desired, the two sections can be marginally sealed and later filled. A feeder support 32 is pivotally supported between the two sections 10 and 11 at their juncture 12. The support 32 comprises a transverse pivot rod 33 bent right angularly at its ends to form right angularly extending ends 34 which are bent to form supporting loops 35. The loops 35 are arranged on parallel planes and may be pivoted from the upstanding supporting position illustrated in full lines in FIGURE 1 to the downwardly projecting positions shown in dotted outline for storage and shipment.

Each side of the feeder is preferably provided with a perch or roost 36 comprising a wire bent to provide a center portion 37 right angularly bent at its ends to provide inwardly extending portions 39. The parallel side portions 39 are connected by short offsets 40 to parallel end portions 41 bent to provide aligned extremities 42 which extend through openings 43 in the end walls 25. The parts are proportioned so that the offsets 40 rest upon the horizontal portions 21 of the laterally extending hollow legs, and the perches are sufficiently resilient so that they may be disconnected if desired, or may fold upwardly to the position indicated in dotted outline in FIGURE 1 for storage and shipment.

After the molding of the body is complete, the connecting member 32 is placed between the two sections, and the two sections are folded until the marginal flanges 29 on the end walls and the marginal flanges 24 on the bottom panels are in face contact. A suitable adhesive or cement is applied between the two sections and the sections are pressed together to complete the feeder.

Figure 6:
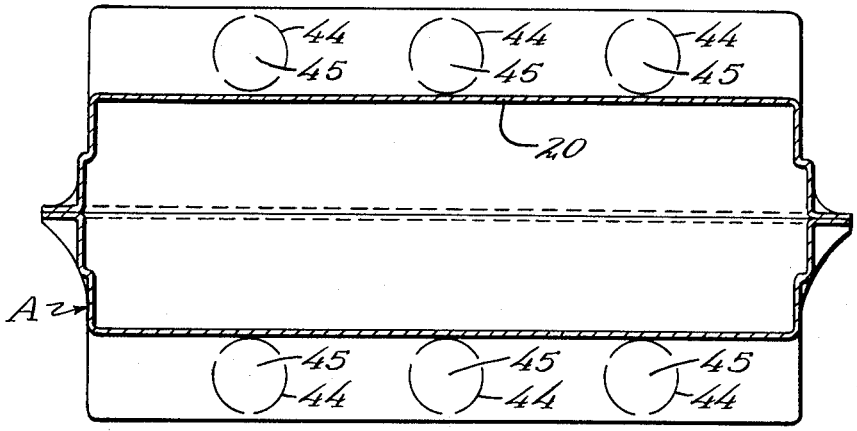
FIGURE 6 is a horizontal sectional view through the feeder, the position of the section being indicated by the line 6—6 of FIGURE 1.

As is indicated in FIGURE 6 of the drawings, potential openings are formed in the panel 21 of each section by means of arcuate cut lines which define circular detachable portions 45 which may be removed to provide the openings 46 shown in FIGURES 2 and 3 of the drawings. The circular shape of the openings 46 is of advantage as they assist in preventing the birds from scratching feed out through the openings. At the same time, the birds may readily eat the feed through the openings. The shape of the feeder is such as to discourage the birds from standing upon the ledges formed by the laterally extending legs or at least standing close to the openings, the tapered wall 19 and ledges 16 allowing the necks of the birds to extend into the openings, but preventing most birds from standing erect. A clip 47 of metal or other suitable material includes a bottom panel 49, upwardly extending flanges 50 at opposite ends of the panel 49, and inwardly extending hook flanges 51 on the upper ends of the flanges 50. The vertical flanges 50 are of slightly greater height than the side flanges 22 of the feeder. When the clip 47 has been flexed into place, as indicated in FIGURE 3 of the drawings, the central panel 49 of the clip engages beneath the lower edges of the marginal flanges 24 on the bottom panels 23 and spring the center portion of the bottom panels 23 upwardly as best indicated in FIGURE 3. This tends to cause the seeds to be directed to the hollow laterally extending legs of the feeder. The swinging of the feeder about the pivot rod 33 also tends to maintain a proper supply of feed in the laterally extending legs.

Figure 7:
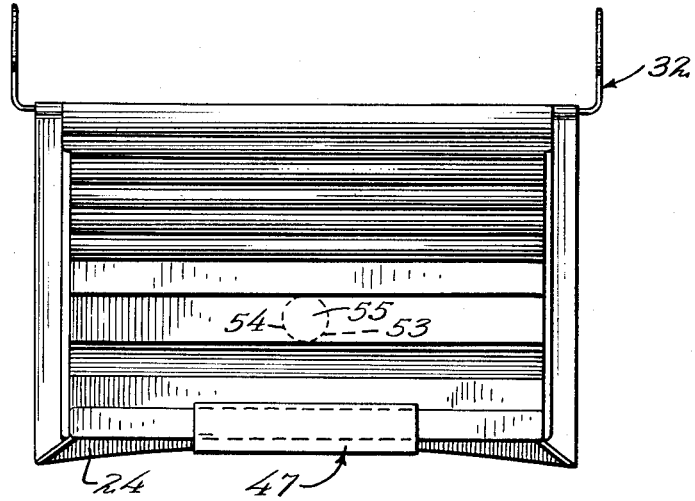
FIGURE 7 is a side elevational view of the feeder in use as a bird house.

As is indicated in FIGURE 7 of the drawings, one of the side walls of the feeder may be provided with one or more potential openings 53 defined by spaced arcuate cut lines 54 to define a removable section 55. After the feeder has been emptied, the section 55 may be removed, and the feeder may be used as a bird house. In this case, the openings 46 serve as ventilation openings.

In FIGURE 4 of the drawings, a modified form of construction is illustrated. The feeder B illustrated in FIGURE 4 is identical with the feeder A with the exception of the fact that the laterally extending hollow legs 56 project outwardly beyond the vertical walls 15 or beyond the portions which simulate the eaves and may serve as a support for birds. In this arrangement, the feed openings are still positioned close to the inner side walls of the body so that only the heads and necks of the birds can reach the feed openings.

In accordance with the patent statutes, we have described the principles of construction and operation of our improvement in bird feeder, and while we have endeavored to set forth the best embodiment thereof, we desire to have it understood that changes may be made within the scope of the following claims without departing from the spirit of our invention.

We claim:

1. A bird feeder comprising a pair of similar hollow sections flexibly connected together along a hinge line, said sections terminating in edge abutting relation and including peripheral flanges extending about the abutting edges thereof, said flanges being in face contact and secured together, said sections having detachable areas defining openings therethrough adapted to provide access to the interior thereof, and perch means on said sections for supporting a bird adjacent to an opening thus formed.

2. The structure of claim 1 and including a supporting rod extending between said sections adjacent to said hinge line.

3. The structure of claim 2 and in which said rod includes supporting loops at opposite ends thereof.

4. A bird feeder including a pair of generally similar hollow sections flexibly connected along a line of hinge, said sections terminating in edge abutting relation and having peripheral flanges on the abutting edges arranged on a substantially flat plane and secured in face contact, the sections including oppositely directed flat hollow legs near the lower end thereof, said legs having detachable areas therein defining apertures in the upper surfaces thereof which, when removed, provide access to the interior of the sections.

5. The structure of claim 4 and including perches supported outwardly of said hollow legs.

6. The structure of claim 4 and including a supporting rod extending between said sections adjoining said line of hinge, and means on the ends of said rod by means of which the rod may be supported.

7. A bird feeder including a hollow body formed of two similar sections to form a house-shaped body having a tapered roof terminating in oppositely directed eaves, side walls beneath said eaves, and laterally extending hollow base portions, the sections also including end wall portions and bottom wall portions extending to a common plane in edge abutting relation, and a peripheral flange on the abutting edges of each section, the flanges being secured in face contact, said sections having apertures therein providing access to the interior thereof.

8. The structure of claim 7 and including a supporting rod between said sections adjacent the top of said tapered roof, and means on said rod for supporting the same.

9. The structure of claim 7 and including perches pivotally secured to the ends of said sections and including portions overlying said hollow base portions for support thereby, and a connecting portion connecting said overlying portions.

10. The structure of claim 7 and including a generally channel shaped clamp of a material more rigid than said hollow body engaged between the sides of said laterally extending hollow base portions, said clamp engaging the lower edge of said flanges connected to said bottom wall portions and acting to bow the bottom wall portions upwardly.

References Cited in the file of this patent
UNITED STATES PATENTS

| | | |
|---|---|---|
| 1,940,010 | Murray | Dec. 19, 1933 |
| 2,475,070 | Wood | July 5, 1949 |
| 2,944,516 | Malloy | July 12, 1960 |